Inventors
WALTER KLINE and
WILLIAM A. BRUBAKER.

Patented Dec. 28, 1937

2,103,678

UNITED STATES PATENT OFFICE 2,103,678

REFRIGERATED SHIPPING AND/OR STORING VESSEL

Walter Kline, Wellington, and William A. Brubaker, Akron, Ohio; said Kline assignor to Ethel H. Morrison, Wellington, Ohio Application February 9, 1935, Serial No. 5,819

1 Claim. (Cl. 220—14)

The present invention relates in general to shipping and/or storing vessels and has particular reference to a spaced wall vessel of this type which is equipped with means for refrigerating the contents of the vessel.

The primary object of the invention is to provide a vessel of the character described for use in shipping and/or storing liquids or solids, which require refrigeration to maintain, either their natural inherent qualities, or to preserve them after processing or other artificial treatments.

A further object of the invention is to provide a vessel of the class described in which the contents may be not only properly refrigerated but maintained under the most strict sanitary conditions so that in the case of edible solids or liquids they may be offered to the consumer in a perfectly fresh and otherwise excellent condition with their flavor and other qualities unimpaired.

A still further object of the invention is to provide a vessel as above described which may be emptied of its contents at any one time or else the contents may be dispensed in small quantities over a period of time without effecting the quality of the remaining portion or the refrigerating advantages of the vessel.

Still another object is to provide a portable vessel having the advantages above pointed out which will be rugged and durable in construction so as to be capable of withstanding the abuse to which it is expected it will be subjected in transportation and other handling.

While a vessel embodying the salient features of the present invention has a wide range of use some forms of the same are especially adapted for the brewery trade where it takes the place of the conventional beer keg or barrel. In this connection another and more specific object of the invention is to provide a substitute for beer kegs or barrels which offer the added advantages of a self contained cooler and portable dispenser. With this sort of equipment the vessels may be filled at the brewery and stored in the cooling room awaiting shipment or delivery. When ready for shipment or delivery the refrigerant may be introduced, thus the temperature of the cooled beer may be maintained until its arrival at its destination and thereafter further maintained by renewing the refrigerant, if and, at such times as it is necessary.

By providing each vessel with the proper dispensing equipment, or else by providing the same with accommodations for attaching such dispensing equipment each vessel thus serves not only as a portable shipping container but upon being delivered to the customer it becomes a self contained cooler and dispenser. It is of course seen that the customer can renew the refrigerant when occasion demands. With a vessel of this type it can be also seen that the customary cooling coils may be done away with when desired.

For the purpose of explaining some of the possibilities of a vessel constructed in accordance with the invention, we are showing several illustrative forms in the accompanying drawings. Obviously those skilled in the art may make various changes in the construction of these forms without departing from the spirit and scope of the invention as defined by the appended claim and we therefore do not wish to be limited to the precise construction thus illustrated and hereafter more specifically described.

Figure 1:
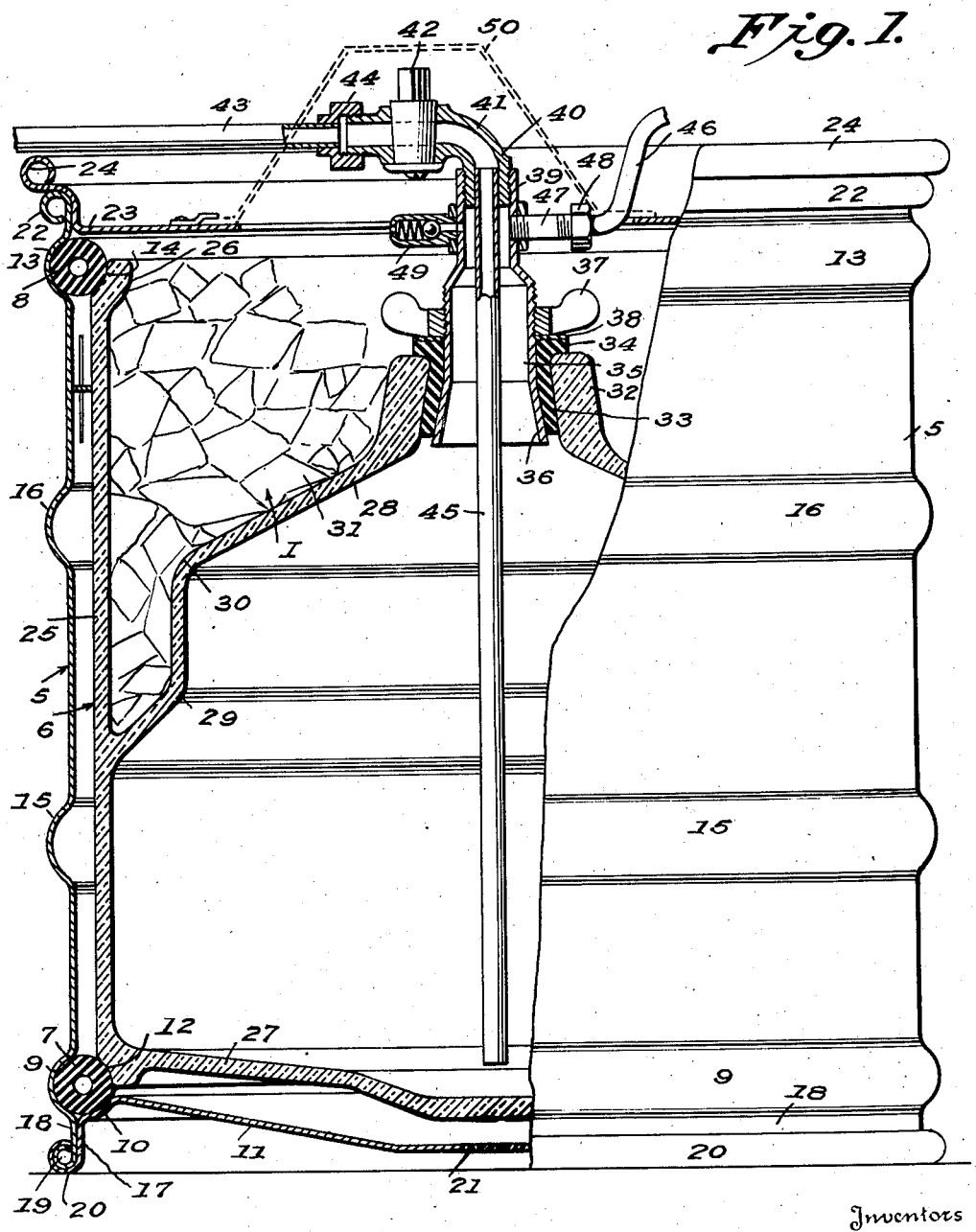
Fig. 1 is a view in side elevation and partly in section of one form of the vessel.

Referring now to the drawings in detail 5 represents an outer metallic shell or drum. This drum is preferably fashioned from relatively heavy galvanized iron so as to serve as a rugged protective shell for the inner container 6 which is housed within the drum and supported in spaced relation thereto by means of the continuous tubular rubber or other equivalent resilient supports 7 and 8. The lower spacing support 7 encircles the periphery of the bottom of the container 6 and is held in place by being embraced on one side by a continuous circular seat formed as at 9 in the side wall of the drum and completed by a similar kind of depression formed as at 10 in the bottom 11 of the drum. The opposed side of the support 8 is seated in a depression 12 formed on the outside of the inner container.

The upper spacing support 8 is likewise confined in companion seats 13 and 14 formed in the drum and inner container respectively.

The inner container is thus resiliently supported by shock absorbing spacers which not only serve as an added protective measure for the inner container but also provide for a space between the walls of the drum and container. This space has some insulating value which is desirable.

It should be mentioned at this time that the circular seats 9 and 13 formed in the drum for spacers 7 and 8 can be likened to corrugations which fortify the structure of the drum, however to further strengthen the drum structure other corrugations are formed as at 15 and 16. The bottom of the drum is constructed as a separately formed disc and the outer edge of the same beyond the seat 10 is turned down as at 17 where it meets and impinges the footing 18 of the outer wall. The joined ends are then curled around the core or insert 19 to leave a circular offset 20 which does very well as a supporting base for the vessel. By making the depending footings 17 and 18 of sufficient depth the supporting base 20 is located in a plane lower than the center area 21 of the bottom of the drum so that the bottom does not contact or at least rest upon, the floor or other surface upon which the vessel is setting.

The upper end of the drum, above the spacing support 8, is curled upon itself to leave a reinforcing bead or rim 22 around the open end of the drum. The open end of the drum, just mentioned is closed by a lid 23 which fits within the opening of the drum and has an outwardly offset curled bead 24 which rests upon the rim 22 and limits the extent to which the lid is inserted within the opening. This bead 24 also serves as a convenient hand hold for removing and inserting the lid.

The inner container 6 is preferably molded or otherwise formed from some material selected for its non-corrosive qualities such as ceramics or the like. In lieu of this material some other material may be used to serve the same purpose provided it has these qualities or is lined coated or otherwise treated to have the same sanitary and non-corrosive properties. Aside from these requirements the material selected should, when possible have a low heat conductivity so as to aid in heat insulating the refrigerating medium and the contents of the inner container.

Taking into account the above noted requirements as well as the dictates of production we prefer to use ceramics.

Figure 2:
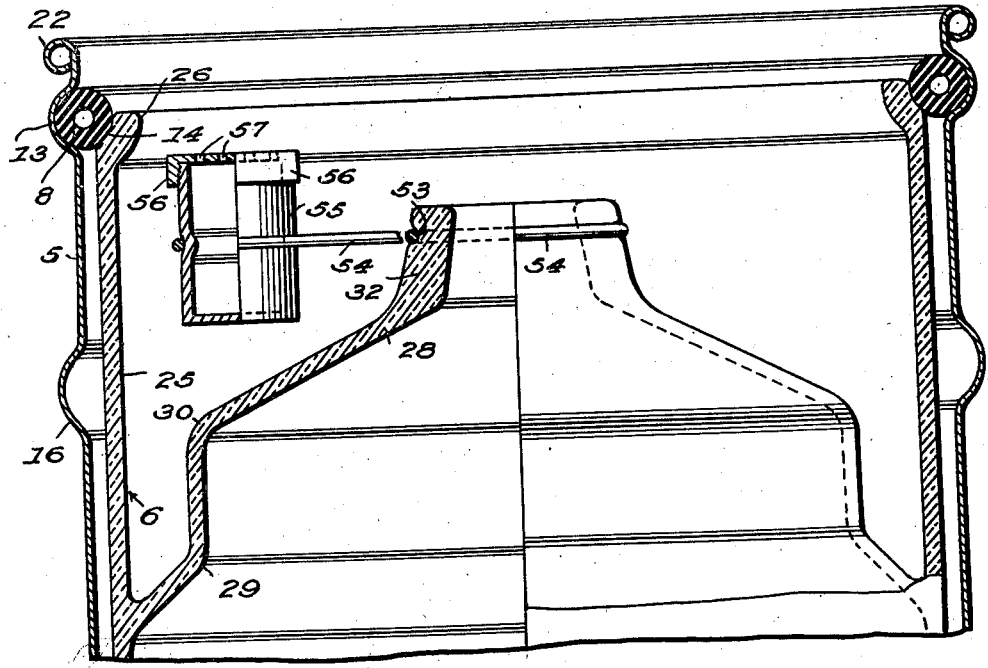
Fig. 2 is a view in section of a modified type at least so far as the refrigerating medium is concerned.

As will be seen in Figs. 1 and 2 this inner container has a side wall 25 which parallels the side wall of the drum for substantially the height of the drum and its upper open end terminates in an increased circular thickness as at 26 around the spacing support 8. Not quite midway between the bottom 27 and the top the container is formed with an integral bell-like dome 28 which branches abruptly inwardly in offset relation to the side wall and thus forming with the lower portion of the side wall a bottle shaped container. The irregular shape of the bell-like dome 28 leaves inwardly and outwardly projecting knees 29 and 30 respectively, which encircle the dome and change the dimension of the refrigerant compartment 31. This compartment 31 in Fig. 1 is made to hold wet ice indicated in part by the reference letter I. The shoulders 29 and 30 are formed so as to lend depth to the ice compartment without sacrificing too much of the holding space within the container as well as to avoid a steep slant on the dome.

The filling and dispensing opening into the container is fashioned by a short thick neck 32.

Figure 3:
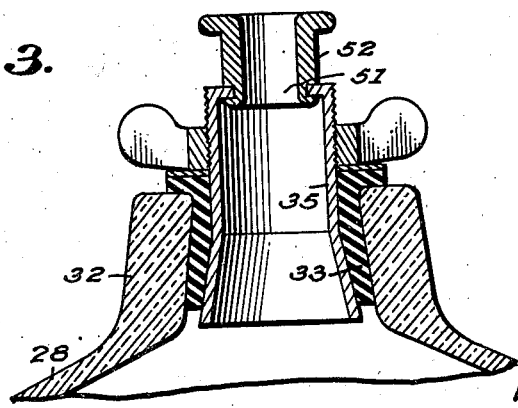
Fig. 3 is a detail view in section showing a modified type of adapter for the dispensing equipment.

In Fig. 1 we have shown one type of dispensing equipment which may be used with the vessel and in Fig. 3 we have shown another type. The type shown in Fig. 1 includes a rubber gasket 33 which is flared to coincide with the inward flare of the throat. A flange 34 on the gasket overlies the top of the neck and fitted within the gasket is a metal sleeve 35 having a flared skirt 36. The outwardly projecting end of the sleeve is threaded to receive the wing nut 37. Inserted between the nut and gasket is a metal washer 38. It now follows, by turning the wing nut down the flared skirt 36 on the sleeve will spread the gasket in the throat at the same time the nut is imparting an inward thrust on the gasket. As a result of this the fitting is tightly wedged in the throat and makes an air and liquid tight closure.

The upstanding end of the sleeve is reduced in diameter to provide a collar 39 which is equipped with internal threads to receive the externally threaded end 40 of the valve housing 41. The plug valve 42 may be turned to open or close the passage through the dispensing pipe 43 which is connected to the valve housing by the union 44. Communicating with the passage in the opposite end of the valve housing is a plated intake dispensing pipe 45 which extends through the sleeve 35 and into the container where its intake end terminates just above the bottom of the container.

An air line 46 enters the side of the collar 39 through a Schrader valve assembly 47 to which it is connected by the union 48. On the opposed side of the collar is a ball check valve assembly 49 which serves as a safety relief for an excess of air supplied the container through the air line.

This dispensing equipment can be used as follows. Since the air line may be disconnected at the union 48 and the dispensing pipe disconnected at the union 44 the remaining parts of the assembly may be supplied along with the vessel and its contents. In this event all the consumer or customer need do is connect up his air line 46 and dispensing pipe 43, open the plug valve 42 and the equipment is in operation.

A cover or cap 50 may be used to cover the opening in the lid 23 which is made to admit the upstanding parts of the dispensing equipment.

In Fig. 3 the dispensing equipment has been modified to the extent that the parts supplied with the vessel become only an adapter arranged to accommodate the customer's own dispensing apparatus. The gasket 33 sleeve 35 and wing nut 37 are substantially the same. The sleeve, however, at the end of the threads has a center opening as at 51 over which is secured a bung or stopper carrier 52. When it is desired to connect the dispensing equipment the bung or stopper is extracted and the ordinary standard dispensing apparatus is applied.

As previously described the compartment 31 which is defined by the side wall 25 and the upper part of the container is adapted to contain wet ice (Fig. 1).

In Fig. 2 we show a scheme for substituting dry ice solidified carbon dioxide, $CO_2$ as a refrigerating medium.

To adapt the vessel for this purpose the neck 32 is grooved or recessed as at 53 to receive a spring steel wire support 54 for the $CO_2$ receptacle 55. This receptacle may be made in any way suitable for the purpose. As shown it comprises a can shaped device which is encircled by the wire support 54. It is important that the $CO_2$ can is supported entirely out of contact with the inner container. In other words it is supported in the space defined by the side wall 25 and the container.

The $CO_2$ can is made with a threaded cover 56 which has a plurality of perforations 57 which serve to release the $CO_2$ gas into the refrigerating space. It is this gas that provides the necessary refrigerating medium. The can will be selected in a size or holding capacity to give the desired predetermined degree of refrigeration. This control may also be regulated by the number and size of the perforations 57. Other means for realizing a more or less definite control may be practiced but such details are immaterial.

The handling and use of the $CO_2$ type of vessel can be carried out in the same manner as explained with reference to the wet ice type. The construction of the two vessels can be the same. As a matter of fact by grooving the throat of all of the containers so as to adapt them to receive the wire support 54 any one vessel can then be used for wet ice or $CO_2$ as and when desired.

We claim:

A vessel of the class described embodying in its construction, a container having a bell-like dome joining the side of the container intermediate the top and the bottom of the same and deflected inwardly of the side of the container to provide a refrigerating compartment below the level of the top of the container, said dome having a filling opening in the top thereof and means for supporting a refrigerating medium in the refrigerating compartment out of contact with the container, comprising a supporting arm secured to and extending laterally from the dome of the container and a holder for solidified carbon dioxide supported by said arm, said holder having a removable cover for filling the holder and said cover having perforations for releasing the carbon dioxide gas into the refrigerating compartment.

WALTER KLINE.
WILLIAM A. BRUBAKER.